C. G. STRANDLUND.
PLOW.
APPLICATION FILED JAN. 28, 1913.
1,125,206.
Patented Jan. 19, 1915.
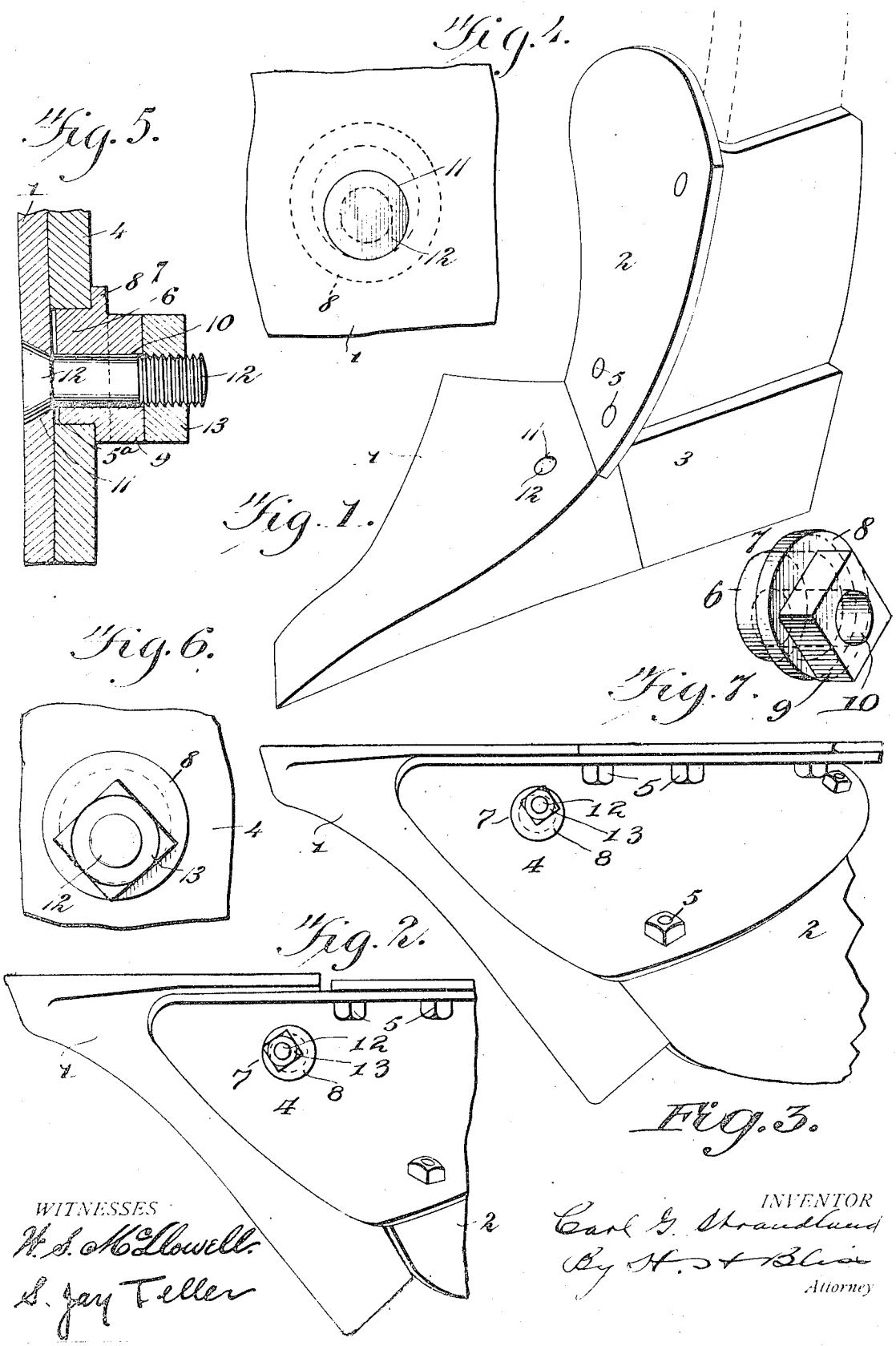
WITNESSES
W. S. McDowell
S. Jay Teller
INVENTOR
Carl G. Strandlund
By H. S. Bliss
Attorney

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

PLOW.

1,125,206.  Specification of Letters Patent.  Patented Jan. 19, 1915.

Application filed January 28, 1913. Serial No. 744,686.

*To all whom it may concern:*

Be it known that I, CARL G. STRANDLUND, a citizen of the United States, residing at Moline, in the county of Rock Island and State of Illinois, have invented certain new and useful Improvements in Plows, of which the following is a specification, reference being had therein to the accompanying drawing.

This invention relates to fastening means for the component parts of a plow, and the object thereof is to provide a plow bottom in which the point or share may be expeditiously attached to or detached from the other parts of the plow body.

In the accompanying drawings I have shown one embodiment of my invention. It will be understood, however, that the right is reserved to effect such modifications and variations of parts, and structural details, as may come fairly within the scope of the appended claims.

Of the drawings:—Figure 1 is a perspective view of a plow embodying my invention. Fig. 2 is a bottom perspective view of a plow showing the fastening means in inactive position. Fig. 3 is a similar view illustrating the fastening means in active position. Fig. 4 is a face view of a portion of the plow share, illustrating the fastening device, and Fig. 5 is a cross sectional view taken along lines 5—5 of Fig. 4. Fig. 6 is a bottom plan view showing some of the parts illustrated in Fig. 5. Fig. 7 is a perspective view of the fastening device separated from the other parts.

Referring more particularly to the drawings, 1 designates the plow point or share; 2 the moldboard; 3 the landside; and 4 the frog to which the other parts are attached by means of bolts or rivets 5, and a fastening device which will be hereinafter described.

Preferably, the forward extremity of the frog 4 is provided with a circular opening 5ª adapted to receive the correspondingly shaped body portion 6 of a washer 7. This washer is formed with an annular flange, as 8, which is designed to rest upon the face of the frog immediately adjacent the said opening 5ª, while the inner face of the body portion of the washer terminates at a point short of the depth or transverse extent of the opening 5ª, as will be found upon inspection of Fig. 5.

Disposed eccentrically and at substantially right angles with respect to the body portion of the washer, is a head 9 in the form of a nut, having a bore, as 10, extending centrally therethrough, as well as through said body portion, and adapted for registration with the opening 11 in the plow share 1. The bore 10 and opening 11 are employed in conjunction with a clamp bolt 12 and nut 13 for the purpose of assembling the washer in proper relation to the plow share and frog.

In use the plow share 1 and frog 4 are arranged in superposed relation, with the opening 11 of the plow share adjacent the wall of the opening 5. The bolt 12 is then thrust through both bolt openings, and the washer 7 is passed over the protruding extremity of the bolt until the annular flange 8 seats against the frog, whereupon the nut 13 is screwed upon the free end of the bolt until it barely engages the head. This engagement of the nut and head is just sufficient to retain the body portion of the washer in the opening and at the same time permit it being rotated upon the bolt with respect to said opening. The position of the washer is clearly shown in Fig. 2, wherein it will be seen that the bolt which constitutes the axis of the washer is located in proximity to the adjacent edge of the frog 4, while the plow share is slightly removed from the landside 3 and moldboard 2. Upon rotating the washer 7 toward the right less than a quarter turn the bolt, owing to its eccentric disposition, will constrain the share toward the moldboard but away from the landside. Further rotation of the washer still shifts the share toward the landside and also toward the moldboard, and it is while the bolt is substantially in this quarter that the share is positioned and forced tightly against both the moldboard and landside, as illustrated in Fig. 3. The share is held in this position by tightening the nut on the bolt, and in this connection it will be pointed out that the nut is caused to engage the head 9 of the washer, which in turn simultaneously forces the annular flange 8 against the frog and draws in the opposite direction upon the head of the clamp bolt. As herein described, the body portion 6 of the washer is of less extent than the depth of the opening 5, and it follows that when the nut is tightened upon the bolt the confronting faces of the share and frog will frictionally engage each other, so as to constitute a reliable clamping action, which will positively prevent displacement of the parts.

When it is desired to detach the share, the bolt is loosened, the washer rotated toward the left until it reaches the position shown in Fig. 2. Then the nut is removed from the bolt, and the share is free.

It will thus be seen that I have devised fastening means, extremely simple in construction, which will permit of the plow share being quickly attached to and detached from the other parts comprising a plow bottom, thereby greatly facilitating the operation of removing the share for the purpose of sharpening, making repairs, or substituting an entirely new share.

What is claimed, is:—

1. The combination with a plow body, comprising a moldboard, a landside and a connecting frog, of a detachable share engaging the frog and having a part alining with the moldboard and a part alining with the landside, and an eccentric member fixedly pivoted directly to the transverse blade of the share at the lower face thereof, the said eccentric member having engagement with the frog and serving when turned to slide the share along the frog.

2. The combination with a plow body, comprising a moldboard, a landside and a connecting frog, of a detachable share engaging the frog and having a part alining with the moldboard and a part alining with the landside, and means movably connected to the share and adjustably engaging the walls of an aperture in the frog at points immediately adjacent the share for locking the share against sliding movement with respect to the frog away from the moldboard and landside.

3. The combination with a plow body, comprising a moldboard, a landside and a connecting frog, of a detachable share engaging the frog and having a part alining with the moldboard and a part alining with the landside, and a cylindrical fastening device eccentrically pivoted to the share and adjustably engaging the walls of a circular aperture in the frog for locking the share against sliding movement with respect to the frog away from the moldboard and landside.

4. The combination with a plow body, comprising a moldboard, a landside and a connecting frog, of a detachable share engaging the frog and having a part alining with the moldboard and a part alining with the landside, a cylindrical fastening device eccentrically pivoted to the share and adjustably engaging the walls of a circular aperture in the frog for locking the share against sliding movement with respect to the frog away from the moldboard and landside, and means for locking the fastening device in adjusted position.

5. The combination with a plow body, comprising a moldboard, a landside and a connecting frog, of a detachable share engaging the frog and having a part alining with the moldboard and a part alining with the landside, and a cylindrical fastening device eccentrically pivoted to the share and adjustably engaging the walls of a circular aperture in the frog for locking the share against movement with respect to the frog away from the moldboard and landside, the said device having a flange engaging the inner face of the frog and serving to lock the share against movement away from the frog.

6. The combination with a plow body, comprising a moldboard, a landside and a connecting frog, of a detachable share engaging the frog and having a part alining with the moldboard and a part alining with the landside, and a cylindrical fastening device eccentrically pivoted to the share and adjustably engaging the walls of a circular aperture in the frog for locking the share against sliding movement with respect to the frog away from the moldboard and landside, the said device having a head adapted to be engaged by a wrench to be turned.

7. The combination with a plow body, comprising a moldboard, a landside and a connecting frog, of a detachable share engaging the frog and having a part alining with the moldboard and a part alining with the landside, and a cylindrical fastening device eccentrically pivoted to the share and adjustably engaging the walls of a circular aperture in the frog for locking the share against movement with respect to the frog away from the moldboard and landside, the said device having a flange engaging the inner face of the frog and serving to lock the share against movement away from the frog and having a head adapted to be engaged by a wrench to be turned.

8. The combination with a plow body, comprising a moldboard, a landside and a connecting frog, of a detachable share engaging the frog and having a part alining with the moldboard and a part alining with the landside, a cylindrical fastening device eccentrically pivoted to the share and adjustably engaging the walls of a circular aperture in the frog for locking the share against movement with respect to the frog away from the moldboard and landside, the said device having a flange engaging the inner face of the frog and serving to lock the share against movement away from the frog, and means for clamping the said flange firmly against the frog face to frictionally lock the device against turning.

9. The combination with a plow body, comprising a moldboard, a landside and a connecting frog, of a detachable share engaging the frog and having a part alining with the moldboard and a part alining with the landside, and a cylindrical fastening device eccentrically pivoted to the share and adjustably engaging the walls of a circular aperture in the frog for locking the share against movement with respect to the frog away from the moldboard and landside, the said device having a flange engaging the inner face of the frog and serving to lock the share against movement away from the frog, having a head adapted to be engaged by a wrench to be turned, and means for clamping the said flange firmly against the frog face to frictionally lock the device against turning.

10. The combination with a plow body, comprising a moldboard, a landside and a connecting frog, of a detachable share engaging the frog and having a part alining with the moldboard and a part alining with the landside, a pivot bolt connected to the share, a cylindrical fastening device eccentrically pivoted on the said bolt and adjustably engaging the walls of a circular aperture in the frog and locking the share against movement with respect to the frog away from the moldboard and landside, the said device having a flange engaging the inner face of the frog and serving to lock the share against movement away from the frog and having a head adapted to be engaged by a wrench to be turned, and a nut threaded on the pivot bolt for engaging the said head to clamp the said flange firmly against the frog face to frictionally lock the device against turning.

In testimony whereof I affix my signature, in presence of two witnesses.

CARL G. STRANDLUND.

Witnesses:
   BERTHA R. MAURER,
   W. G. DUFFIELD.